United States Patent [19]

MacCanna et al.

[11] Patent Number: 4,472,929
[45] Date of Patent: Sep. 25, 1984

[54] MUSHROOM HARVESTER

[76] Inventors: Cathal MacCanna, 1177 Guildwood Blvd., London, Ontario, Canada, N6H 4G8; Peter Van den Bosch, 1337 Boulevard Lebel, Chambly, Quebec, Canada, J3L 2N2

[21] Appl. No.: 419,134

[22] Filed: Sep. 17, 1982

[51] Int. Cl.³ ............................................ A01D 45/00
[52] U.S. Cl. .................................. 56/327 R; 56/13.3
[58] Field of Search .................. 56/327 R, 13.3, 16.5, 56/16.6, 155, 158

[56] References Cited

U.S. PATENT DOCUMENTS

| | | | |
|---|---|---|---|
| 1,347,733 | 7/1920 | Davis | 56/13.3 |
| 2,509,970 | 5/1950 | Edmonds | 56/13.3 |
| 3,624,990 | 12/1971 | Sinden et al. | 56/327 |
| 3,635,005 | 1/1972 | Persson | 56/327 R |
| 3,970,150 | 7/1976 | Gibson, Jr. et al. | 171/56 |
| 4,189,906 | 2/1980 | Cooper | 56/327 R |

FOREIGN PATENT DOCUMENTS 7904028 11/1980 Netherlands ....................... 56/327 R
1336393 11/1973 United Kingdom .

Primary Examiner—Jay N. Eskovitz
Attorney, Agent, or Firm—Fisher, Christen & Sabol

[57] ABSTRACT

The present invention provides a compact mushroom harvester which utilizes a relatively short blade adapted to oscillate horizontally in an arcuate manner and move laterally and longitudinally over the bed, thereby allowing selected mushrooms or small groups of mushrooms to be picked individually. The picked mushrooms are transferred from the bed, preferably by a vacuum article transfer device.

3 Claims, 8 Drawing Figures

MUSHROOM HARVESTER

The present invention is concerned with the mechanical harvesting of delicate lightweight articles, especially natural products such as mushrooms.

BACKGROUND OF INVENTION

Natural products, such as mushrooms, are generally picked individually and by hand, a very expensive procedure when current labor costs around the world are considered. As would be expected, as consumer demand for mushrooms and like food items has grown, considerable expense and effort has been expended in attempts to develop mechanical harvesting devices capable of reducing or even eliminating the necessity for manual involvement in the harvesting of the product. Such devices generally attempt to mechanize the actual picking of the product, as well as its subsequent transfer to a packing station. The problems which need to be overcome if successful mechanical harvesting of mushrooms or the like is to be achieved are many and are inherent in the mushroom growing process. Mushrooms are grown in rooms or enclosures where the desired environmental conditions of humidity, temperature, etc. are maintained, either naturally or artificially, in order to assist rapid growth of the mushrooms which is required for efficient production. Obviously, the maintaining of such conditions is not inexpensive and consequently, the plant equipment is arranged to fill the room or enclosure volume to the greatest possible extent commensurate with efficient production. Thus, mushrooms are grown commercially in trays or continuous beds containing the growing medium, such trays or beds being disposed in horizontal tiers separated vertically by a distance of only about 9-18 inches, being the minimum distance required to permit access to the mushrooms for harvesting using current methods. If the environmental conditions are maintained at optimum i.e. such that maximum growth is obtained, the mushrooms grow rapidly and frequently double or more in size in any given twenty-four hour period. Moreover, the mushrooms in any one bed or tray do not grow at an even rate. As a consequence, if mushrooms of uniform high quality are to be obtained, the mushrooms must be harvested at least on a daily basis. In fact, each bed must be harvested up to about four times if the optimum yield of high quality mushrooms is to be obtained. If harvesting is only effected once on each bed, i.e. all mushrooms are to be harvested at the same time, then both mature and non-mature mushrooms will be harvested with the result that many will be of lower quality and in any event, sorting of the mushrooms must be effected. Moreover, it must be borne in mind that the surface of the beds are not flat but undulate to some extent and mechanical harvesting devices to date have not been able to successfully take that fact into account manual. Manual harvesting operating is laborious and quite inefficient as will be appreciated when one considers that the beds or trays are some 4-5 feet wide requiring a picker to lean over the bed for a large fraction of each work shift; and the distance between the beds or trays is only 9-18 inches; which is little room for even an experienced picker to effect the task of rapidly evaluating which mushrooms are of a mature quality and subsequently picking such mushrooms. Often, damage results to mushrooms which are immature and are left to be picked at a subsequent harvesting.

One attempt to harvest mushrooms mechanically is disclosed in U.S. Pat. No. 3,624,990 which describes a machine which includes a vibrating or rapidly oscillating elongated knife which cuts the stems of the mushrooms whilst a superimposed brush rotates with a forward movement of a carriage carrying the knife edge and holds the mushroom stems against the pressure of the knife blade. The brush subsequently pushes the cut mushrooms to a collecting belt conveyor which moves them to a collecting receptacle. The knife blade is of a length sufficient to extend over the full bed and consequently, harvest all of the mushrooms in one pass. The device, obviously, is totally non-discriminatory as regards the condition of individual articles being harvested. Special note may also be taken of the fact that the mushrooms are subjected to a relatively severe physical treatment by the brush member which can, and does, result in damaged product. A further apparatus for harvesting mushrooms is described in U.S. Pat. No. 3,970,150. This device was developed to be used in conjunction with a growing method in which an attempt is made to ensure that the mushrooms are grown in uniform rows and consequently are readily conducive to automatic harvesting. This procedure prima facie reduces the area of bed available for crop production, a very serious restriction when, as mentioned above, efficient production necessitates making the best use of all available growing area. The described apparatus is extremely complex and includes a number of pairs of members, each pair being arranged to lift up, individually, only mature mushrooms and, via a wheel arrangement, transfers same to a collection vessel. British specification No. 1336393 discloses a device for picking mushrooms which device includes a number of flexible nozzles each of which is in the form of a bellows-shaped body whose orifice fits over the head of each individual mushroom. Upon application of a vaccuum through the nozzles the bellows retract inwards and rotates and in doing so pull the mushrooms from the bed. A number of the said nozzles are included in a casing and the object is to manoeuvre the casing above a group of mushrooms, and so load all the bellows before bringing the loaded casing above a collecting basket. Obviously, this device leaves a lot to be desired, especially when one considers the unevenous of the beds and the difficulties in manoeuvering the casing. Another device which also utilizes a vacuum is disclosed in U.S. Pat. No. 3,635,005. This device is designed generally to be stationery; trays of mushrooms to be harvested are to be brought to the device and passed therethrough. As in the device as disclosed in U.S. Pat. No. 3,624,990, an elongated cutter blade is used which oscillates linearly across the bed, cut mushrooms are then blown via a number of air jets into collections means which consist of a large inlet to a mushroom collector vessel. A vacuum is continuously applied to the mushroom collector and consequently, through to the collecting conduit. In the mushroom collector, the entering mushrooms impinge upon a sponge member and subsequently drop into a receptacle. This device obviously is very cumbersome and could not be used in situ; i.e. on the mushroom beds located in their tier arrangement. This effectively would preclude its use in many modern plants, such as that of the present assignee, which utilizes continuous beds. Moreover, it is designed to be used in association with a mushroom crop containing relatively orderly rows of mushrooms—not the normal situation in most new commercial mushroom growing operations, and obviously there is no discrimination as to the maturity etc. of the mushrooms which are to be harvested. Also, the positive directing of a relatively large number of mushrooms simultaneously into and through the collecting housing to the mushroom collector leaves a lot to be desired as far as the delicate handling of the product is concerned. Moreover, presumedly the system has to be shut down to retrieve the mushrooms from the receptacle, yet another product handling stage and one which is not really commercially viable.

It is the object of the present invention to provide a mushroom harvester which can rapidly, continuously and most important selectively pick mushrooms from a growing bed and transfer the picked mushrooms from the bed to a packing station, or the like.

A further object is to provide such a device which is simple and relatively inexpensive to produce and can be extremely compact and hence be conveniently utilizable in the narrow space between growing beds.

STATEMENT OF INVENTION

It has been found, and this finding forms the basis of the present invention, that the use of a relatively short cutting blade arranged to oscillate in an arcuate manner over a relatively narrow angle can effectively and quickly harvest only mature mushrooms from a bed comprising both mature and immature mushrooms without unduly affecting the mushrooms which are to be left for picking at a later time.

According to the present invention there is provided a mushroom harvester for selectively harvesting mushrooms from a growing bed, comprising a housing, a shaft projecting downwardly from said housing, relatively short blade means secured to said shaft and oriented in a plane substantially parallel to a plane including a top surface of the bed, means for oscillating said shaft in an arcuate manner just above said top surface of the bed and means for collecting mushrooms reaped from the bed.

It is preferred that the knife blade be relatively short and preferably on the order of 1-4" in length. Moreover, it is also preferred that both edges of the blade be adapted to provide cutting edges, this assisting in the flexibility of the device when it is moved across the surface of the bed.

The means used to collect mushrooms cut by the blade is preferably one utilizing vacuum means and in particular, a mushroom transfer device claimed in the present assignee's copending application, U.S. Ser. No. 419,519 filed Sept. 17, 1982, has been found to be fully satisfactory for this purpose. However, other means could be used for collecting the mushrooms.

In a preferred embodiment, therefore, the present invention provides a harvester for selectively harvesting mushrooms from a growing bed, comprising a housing, a shaft projecting downwardly therefrom, relatively short blade means secured to said shaft and oriented in a plane substantially parallel to a plane including a top surface of the bed, means for oscillating said shaft in an arcuate manner and means for collecting mushrooms reaped from the bed, which latter means comprises an article transfer device comprising a housing having a generally cylindrical chamber, inlet means whereby articles may enter said chamber and outlet means whereby any such articles may exit said chamber, at least two vane members in said chamber, each having a length substantially equal to that of the chamber and a width substantially equal to a radius of said chamber, each of said vane members being arranged to rotate around a longitudinal edge thereof, which edge is substantially coincident with a central longitudinal axis of the chamber, the vanes co-operating to divide said chamber into a plurality of subchambers, connecting means to connect said chamber to a source of vacuum, the location of said connecting means, said inlet and outlet means being arranged to provide, when vacuum is applied to said connecting means, a vacuum at least in the subchamber then adjacent the inlet means, which vacuum is the sole means drawing mushrooms into said chamber through said inlet means.

The selective mushroom harvester of the present invention will be further described by reference to, but not limited by he accompanying drawings which are as follows.

Figure 1:
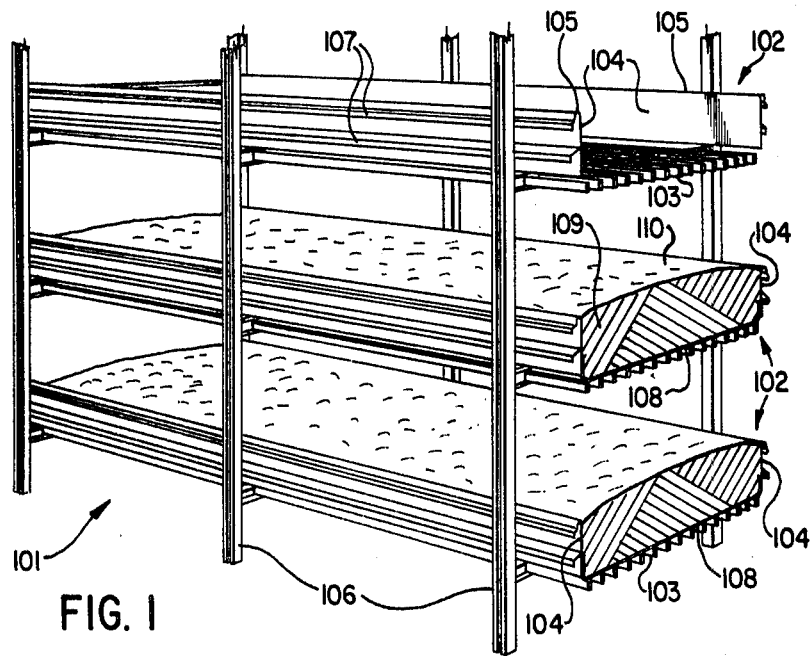
FIG. 1 is an angled side elevation of a three-tier or three-bed mushroom growing system.

In the drawings, FIG. 1 shows the three-tier rack arrangement generally designated 101 a number of such racks being included in each growing room. Each shelf 102 in the racks consists of a floor 103 and two opposing sidewall members 104. Each sidewall member terminates in a rounded upper edge 105 which, as will be seen, can serve as a rail for the wheels of a trolley or the like used in servicing the bed. Each shelf 102 is carried by upstanding support members 106 which are laterally spaced from rounded members 105 by sidewall carrying brackets 107. For convenience and hygiene, the whole rack arrangement may be constructed from a metal such as stainless steel or aluminum. A sheet material or the like 108 is laid upon the slats and together these comprise the floor 103 of each shelf member. The mushroom growing bed 109 is built up thereon. The upper surface of bed 110 projects above the height of the sidewalls 104 and contacts sidewalls 104 by way of a small camber or slope. The upper surface 110 of bed 109 is uneven and the mushrooms grow thereon in a relatively random manner.

Figure 2:
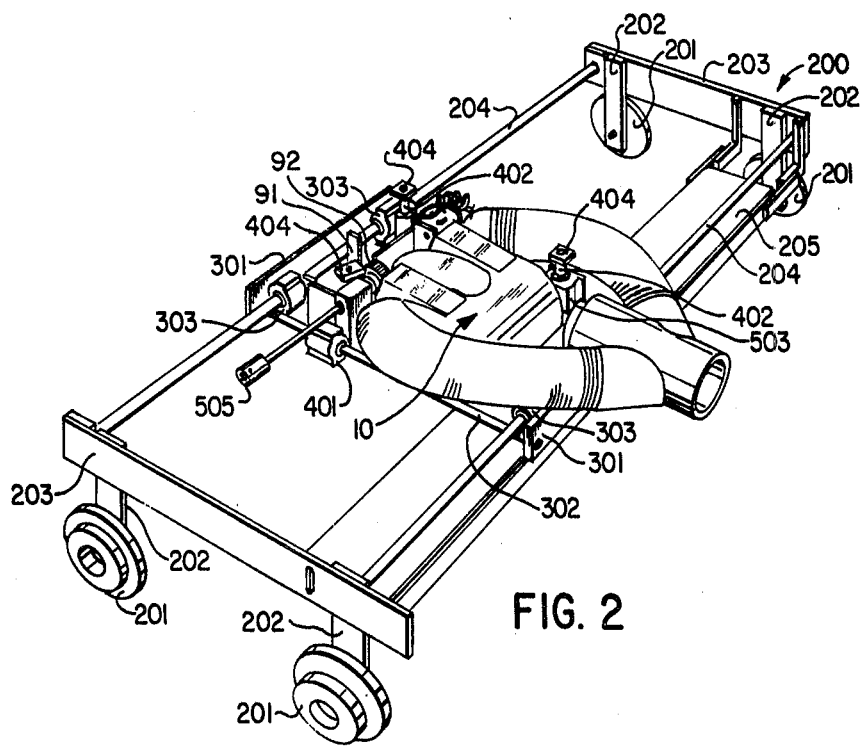
FIG. 2 is an angled downwards side elevation showing the mushroom harvester of the present invention mounted on its accompanying shelf-riding trolley which also carries an auxiliary mushroom take-off belt conveyor.

In a particularly preferred embodiment of the present invention, the mushroom harvester illustrated in FIG. 2 of the drawings, comprises a nested series of four-carriage sub-assemblies including a principal carriage or trolley 200, arranged on wheels 201 and being operable to advance the other three sub-assemblies along the bed shown in FIG. 1. The wheels 201 are fixed in mutually spaced apart relation on a frame comprising wheel struts 202, side bars 203, and rods 204. Also depicted in FIG. 2 is a belt conveyor 205 arranged between the side bars 203 and operable in conjunction with mushroom transfer device 10, to facilitate the mushroom harvest.

A second carriage sub-assembly including a frame, comprising bars 301 and rods 302 (only one is shown) is borne on mutually spaced apart pillow blocks 303. Pillow blocks 303 are slidably arranged on rods 204 so as to permit lateral movement of the second carriage sub-assembly across the width of the principal carriage sub-assembly.

A third carriage sub-assembly includes a frame (not shown) which is borne on pillow blocks 401 (only 1 of 3 is shown in FIG. 2). Pillow blocks 401 are attached to that frame in mutually spaced apart relation, and are slidably arranged with rods 302 such that the third carriage sub-assembly may be moved in either direction along the length of rods 302.

The frame of the third carriage sub-assembly further includes upright posts 402 (only 2 of 3 are shown). One of the two ends of each respective post 402 is secured to the frame, and the other terminates in a respective travel-stop plate 404.

Pillow blocks 503 are attached to the frame of a fourth carriage sub-assembly and are slidably arranged with upright posts 402 so as to be vertically moveable therealong, in such a manner as to permit the fourth carriage sub-assembly to be raised or lowered with respect to the surface of the mushroom bed. Handle 505 is connected to a rack 91 and pinion 92 mechanism (not shown), which is operable on rotation of handle 505 to raise and lower the fourth carriage sub-assembly within the limits of travel along posts 402.

A mushroom cutting device (not shown) and transfer device 10 are secured in fixed relation to the fourth carriage sub-assembly and are moveable therewith.

FIGS. 3, 4, 5 and 6 depict differing views of a portion of the same mushroom harvester that is illustrated in FIG. 2.

Figure 3:
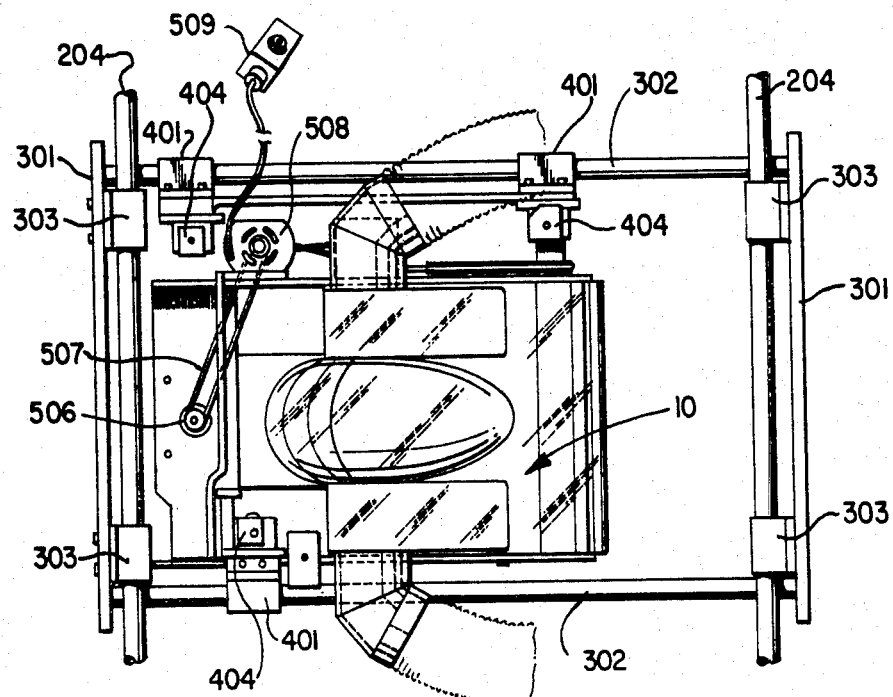
FIG. 3 is a top plan view of the mushroom harvester shown in FIG. 2 with portions of the vacuum hoses depicted in phantom and the trolley omitted.

Referring now to FIG. 3 in particular (which represents a top plan view of the harvester of FIG. 2) certain details of the mushroom cutting device can be seen. A rotable shaft 506 is driven via a belt 507 by electric motor 508. The variable speed motor may be controlled by adjustment of the rheostat 509 which is electrically connected therewith for that purpose.

Figure 4:
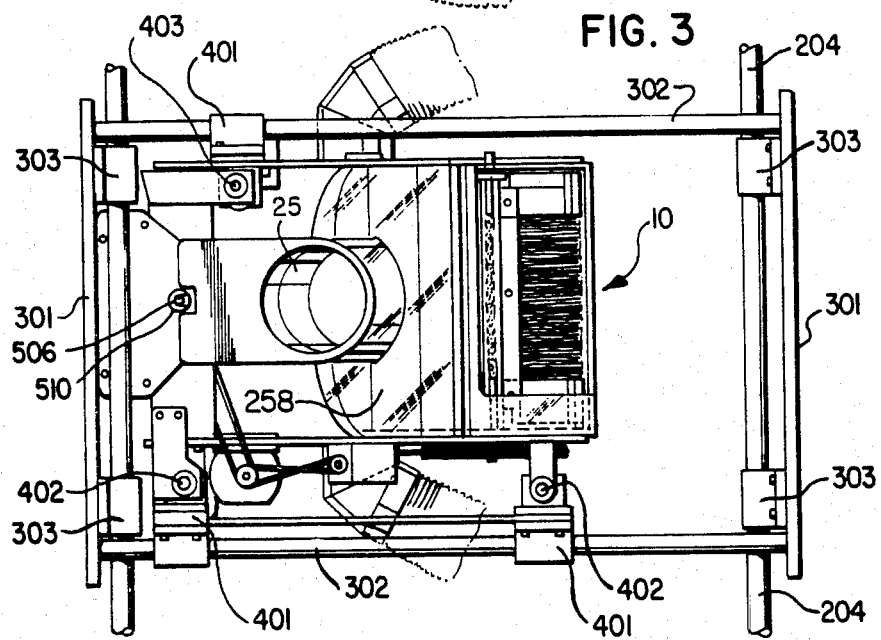
FIG. 4 is a bottom plan view of the mushroom harvester shown in FIG. 3.

FIG. 4 is a bottom plan view corresponding to FIG. 3. Cutter blade 510 can be seen attached to oscillatory shaft 506.

Figure 5:
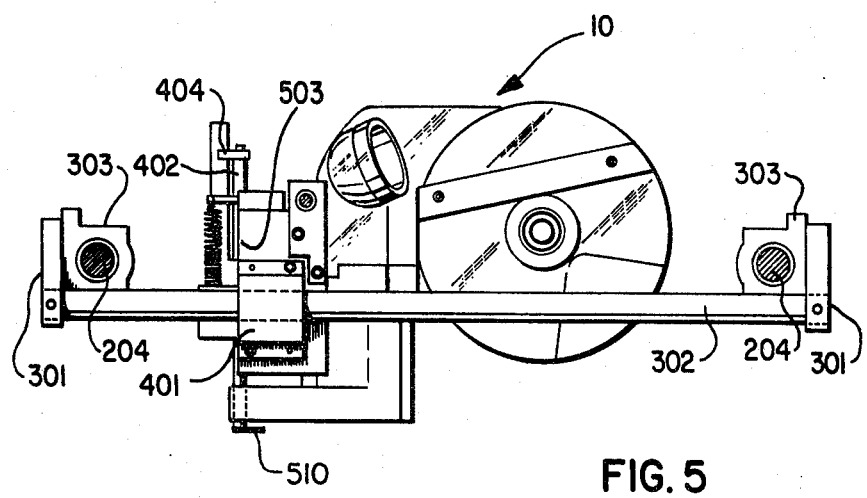
FIG. 5 and FIG. 6 are side elevations of the mushroom harvester shown in FIG. 2 with the vacuum hoses and trolley being omitted.

FIG. 5 is an elevated side view of a portion of the harvester depicted in FIG. 2.

Figure 6:
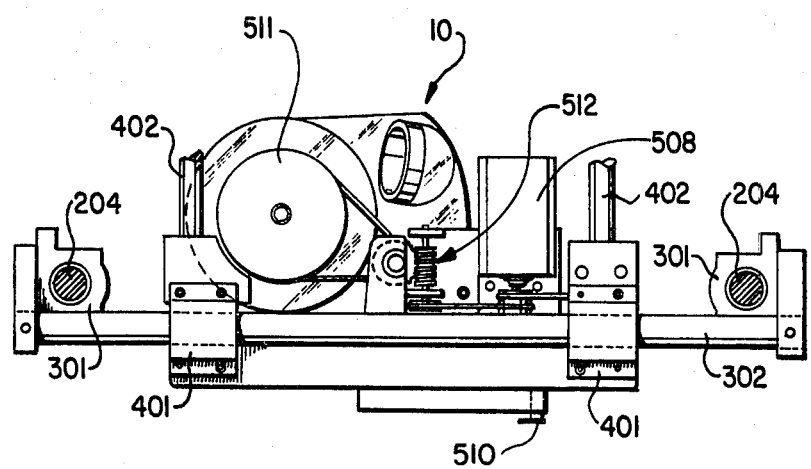

FIG. 6 is a side elevation of the side opposite that depicted in FIG. 5. Transmission 512 is depicted intermediate motor 508 and mushroom transfer device pulley 511 is illustrative of the manner in which power, transmitted from the motor, is utilized to drive the mushroom transfer device.

As described above, provision has been made whereby the unit comprising the cutter blade device and mushroom transfer device can move up and down in a vertical direction, this provision allowing for the cutter blade to be positioned exactly above the bed even if the latter undulates to some extent. This vertical movement of the unit is effected by way of the above-noted rack and pinion device.

Figure 7:
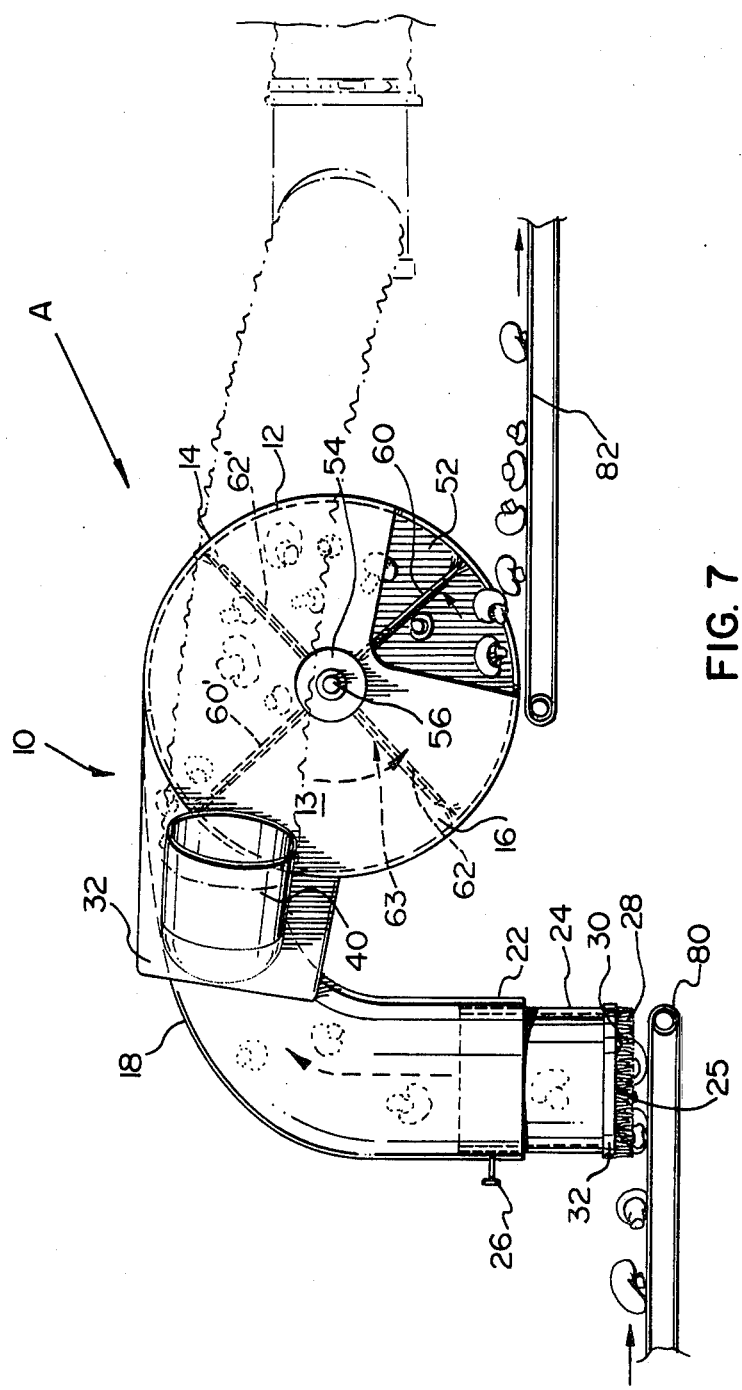
FIG. 7 is a side elevation of the mushroom transfer device incorporated in the harvester shown in FIG. 2.
Figure 8:
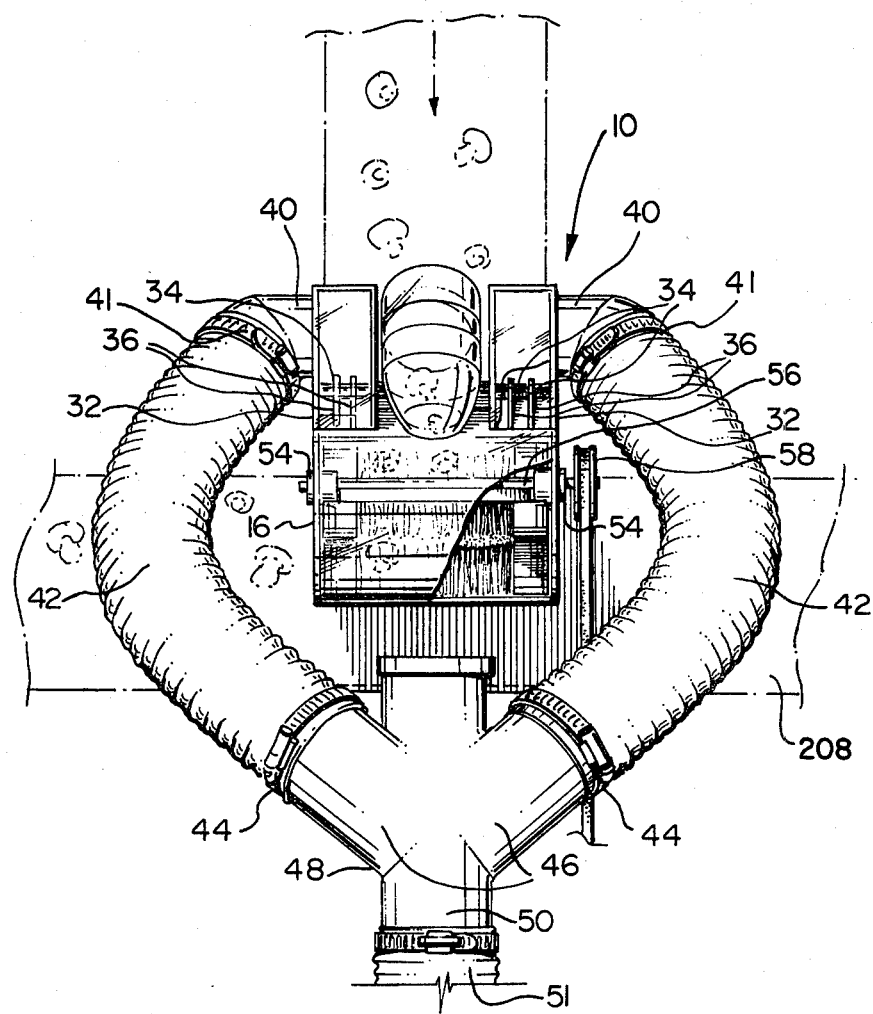
FIG. 8 is a top plan view of the transfer device shown in FIG. 5 taken in the direction of arrows A and B respectively.

Turning to FIGS. 7 and 8, the transfer device incorporated in the specific embodiment of the present invention generally designated 10 comprises a cylindrical housing 12 which defines a generally cylindrical chamber 13, said housing being formed of a cylindrical body member 14 and two circular end members 16. Secured to an upper portion of body member 16 is an inlet conduit 18 which, by way of an inlet opening (not shown) communicates with the interior of chamber 13. Slideably located within the end portion 22 of inlet conduit 18 is a further conduit member 24 which may be locked in any desired position by way of lock screw 26, thus constituting light adjusting means. A brush-like skirt 28 is secured around the perimeter 30 of conduit member 24 by way of adhesive band 32.

Also secured to said upper portion of body member 16 are two small generally rectangular housings 32, the interior volume of each housing 32 communicating with the interior of chamber 13 through an associated generally rectangular ports 34 the opening of which are partially restricted by a grill arrangement consisting, in each case, of two arcuate ribs 36 located in the plane of body member 16. Also communicating with the interior of each housing 32 is an associated conduit 40 each of which is secured to a wall of its associated housing 32. Secured by clamps 41 to each of conduits 40 is a flexible hose 42, each of hoses 42 being secured by clamps 44 to an angled outlet 46 of a manifold 48. The third outlet 50 of manifold 48 is connected to a source of vacuum, (a device employing a 10" fan and a 1 h.p. motor) by way of a further hose 51. However the specific sourse of vacuum is not critical: the vacuum requirements in each specific instance are readily found by simple experiment. A part of a lower portion of body member 16 and one end member 16 are cut away to form exit opening 52. Each end wall 16 is provided with a bearing 54 and a rotatable metal axel 56 is carried by the bearings and extends through one end wall 16 an amount sufficient to carry pulley member 58. Secured to axel 56 are two pairs of similar vanes 60 and 60', and 62 and 62', (all but vane 60 being shown in phantom in FIG. 7).

Each vane comprises two rigid perspex end members and a resilient flexible centre member taking the form of a brush having semi-stiff bristles. The vane members are maintained in one plane by being sandwiched between a first plate which is secured by a weld to axel 56 and another plate which is secured to the first plate by nuts and bolts. Secured by strips of adhesive tape to the axially and radially, respectively, outermost edges of the perspix end members are strips of rubber which constitute an air seal between the vane members and the interior wall of chamber 16 and ensure a good effective vacuum in the compartment adjacent the inlet opening 20. A motor has a pulley selected such that the combination of ratio of the two pulleys and the motor speed results in the rotor assembly consisting of axel 56 and the vanes 60, 60', 62 and 62'' rotating at a constant low rate—in this specific embodiment, a rate of about 45 rpm.—has been found to be fully effective. The use of four vanes ensures that the vacuum applied to the inlet conduits is maintained consistent since a full air lock is achieved; and the volume in each compartment is of a size which precludes excessive movement and jostling of mushrooms as they enter each subcompartment and are restrained as they are gently led to the outlet. However, more or less than four vanes also proves effective, down to two vanes which constitute a plane member e.g. 63 which divides the interior volume constituting chamber 13 into two equal compartments. In such a situation the vacuum supplied to inlet conduit 22 is not fully constant since there are occasions during the rotor assembly rotation cycle when some vacuum may be lost due to the large size of subcompartments and the specific locations and size of the inlet opening, vacuum opening and exit openings. In essence, for a brief period of tim᷈ 2, there could be a momentary reduction in the degree of vacuum applied to the inlet conduit 22 since the vacuum source may be connected partially to both subcompartments and, consequently, might be simultaneously connected to the outlet opening. The brush portion of the vane ensures that any articles caught between the radially outermost portion of the vane and the chamber wall or inlet is "passed over" by the vane i.e. does not jam the rotor movement. Any such article would, of course, subsequently enter the subcompartment behind the vane in question—obviously the vane flexible portion will be located on the vane in the area which moves over the inlet, be that on the cylinder wall or an end wall of the cylinder, as it might well be in other embodiments of the invention.

The detailed operation of the mushroom transfer device per se is described in detail in copending application U.S. Ser. No. 419,519 filed Sept. 17, 1982, the subject matter of that application being incorporated herein by reference.

The mushroom harvester device of the present invention operates as follows:

As shown assembled in FIG. 2, the device is raised so as to lie above a growing bed and both pairs of flange wheels 201 are positioned on edges 105 of a pair of sidewalls 104. The trolley will then be movable along the full length of the bed. Next, the unit comprising the cutting knife device and mushroom transfer device is adjusted vertically using the aforementioned rack and pinion device until the knife blade is positioned just above the top surface of the growing bed by way of a set screw arrangement (not shown) that position is then locked in as the position below which the said unit cannot travel. It can, of course, be raised higher than that point by further movement of the rack and pinion device. At this time, it might be necessary to adjust the height of the mushroom entering port 25 so as to ensure efficient recovery of mushrooms being cut by the knife blade. Such adjustment is made by sliding movement of conduit 24 within conduit 22 and when the desired location has been reached securing of screw 26. It should be noted that knife blade extends below the edge of the article conduit 24 and consequently upon arcuate oscillation of the knife blade the cut mushrooms will immediately be drawn vertically into conduit 24 of the mushroom transfer device, in most cases without contacting the bed itself. It can be seen, therefore, that the mushrooms will be obtained in a clean state.

As was explained above, the second carriage may be moved with very little effort backwards and forwards across the bed on rods 204 utilizing the pillow blocks associated therewith. In a like manner, the third carriage can be moved at will in a direction longitudinally up and down a bed on rails 302 and the pillow blocks associated therewith. The combination of the two allows the cutting knife/mushroom collector conduit 24 to be moved to any desired location on the bed i.e. the device is totally selective.

To commence collection of mushrooms, the transfer device is connected to an active vacuum source and power is supplied through rheostat 509 and consequently to motor 508, this commencing rotation of the rotor device in the mushroom transfer unit and also commences the arcuate oscillating movement of the 2" cutting blade. Separate power is supplied to the electric motor which drives conveyor 205. A short time is all that is required to optimize the speed of the conveyor, rotor and knife blade. The operator then merely stands to one side of the racks and by way of handle 505 is able to direct the cutting blade and collector to individual or small clumps of mushrooms which are mature and, therefore, in a condition to be picked. Once cut, the mushrooms are drawn up through the mushroom transfer device through exit port onto conveyor 205 where they are automatically transported to the side of the conveyor into a waiting receptacle. When the area of bed below the device has bee fully harvested, the device is simply rolled to the next section. As will be appreciated, the device is totally selective. However, the device could be used as a mass-harvester if required. This would simply entail moving the cutter blade/mushroom transfer device laterally across the bed in a number of adjacent lateral movements until the area below the device has been completely harvested. The device would then be moved to the next adjacent area and the operation repeated. Use of the device in this manner would still give substantial benefits since it would still be much faster than the manual picking presently utilized even when mass-harvesting is desired.

We claim:

1. A harvester for selectively harvesting individual mushrooms or clumps thereof from a growing bed, said harvester comprising:

a housing adapted to be situated above a mushroom crop growing on said bed;

a shaft projecting downwardly from said housing and connected in driven relation to an oscillatory drive means mounted on said housing;

means located on said housing and adapted to permit said shaft to be moved laterally to and fro across the width thereof;

means located on said housing and adapted to permit said shaft to be moved longitudinally back and forth along the length thereof;

an elongated, double-edged blade of about one to four inches in length, secured directly to said shaft and extending radially outwardly therefrom, said blade being adjustably oriented in a cutting plane substantially parallel to a reference plane including a top surface of said bed wherein said drive means is operable to drive said blade through said shaft in an oscillating, arcuate manner in said cutting plane;

means mounted on said housing for adjusting the height of said blade relative to said reference plane whereby said blade may be raised from said cutting plane to a height above said crop; and means for collecting mushrooms reaped from said bed.

2. A harvester according to claim 1 in which said means for collecting mushrooms comprises vacuum collecting means.

3. A harvester according to claim 1 wherein said means for collecting mushrooms reaped from the bed comprises an article transfer device including a housing having a generally cylindrical chamber, inlet means whereby articles may enter said chamber, and outlet means whereby any such articles may exit said chamber, at least two vane members in said chamber each having a length substantially equal to the radius of said chamber, each of said vane members being arranged to rotate around a longitudinal edge thereof which edge is substantially coincident with a central longitudinal axis of the chamber, the vanes cooperating to divide said chamber into a plurality of subchambers, connecting means to connect said chamber to a source of vacuum, the location of said connecting means, said inlet and outlet means being arranged to provide, when vacuum is applied to said connecting means, a vacuum at least in the subchamber then adjacent the inlet means, which vacuum is the sole means of drawing mushrooms into said chamber through said inlet means.

* * * * *